United States Patent [19]

Skarman et al.

[11] Patent Number: 4,672,229
[45] Date of Patent: Jun. 9, 1987

[54] WALL-MOUNTED TOUCH CONTROL SWITCH

[75] Inventors: John S. Skarman, Newport Beach; Todd W. Milby, Huntington Beach, both of Calif.

[73] Assignee: Southwest Laboratories, Inc., Costa Mesa, Calif.

[21] Appl. No.: 808,457

[22] Filed: Dec. 12, 1985

[51] Int. Cl.$^4$ ............................................. H01H 35/00
[52] U.S. Cl. .................................... 307/115; 307/116; 200/33 R; 200/DIG. 1
[58] Field of Search ............... 307/116, 117, 115, 308, 307/311, 252 B; 200/17 R, 33 R, 34, 39 R, DIG. 1, DIG. 36

[56] References Cited

U.S. PATENT DOCUMENTS

| | | | |
|---|---|---|---|
| 3,641,410 | 2/1972 | Vogelsberg | 200/DIG. 1 X |
| 3,842,258 | 10/1974 | Shaw | 250/239 X |
| 4,119,864 | 10/1978 | Petrizio | 307/116 |
| 4,152,629 | 5/1979 | Raupp | 307/116 X |
| 4,164,635 | 8/1979 | Finch et al. | 200/33 R |
| 4,213,061 | 7/1980 | Conner | 307/116 |
| 4,237,386 | 12/1980 | Instance | 307/116 |
| 4,246,494 | 1/1981 | Foreman et al. | 307/116 |
| 4,246,533 | 1/1981 | Chiang | 307/116 X |
| 4,250,432 | 2/1981 | Kohler | 307/116 X |
| 4,293,745 | 10/1981 | Matsuda et al. | 200/DIG. 1 X |
| 4,348,564 | 9/1982 | Ohtaki et al. | 200/33 R X |
| 4,360,737 | 11/1982 | Leopold | 307/116 |
| 4,468,573 | 8/1984 | Hehl | 307/116 X |
| 4,490,625 | 12/1984 | Dilly | 307/116 |
| 4,558,261 | 12/1985 | Cheng | 307/116 X |

OTHER PUBLICATIONS

Leviton Wiring Device Catalog D-200, Revision B—1 page advertisement, p. B1, entitled, "Dimmer Controls", showing Senitron Touch Control Dimmers.
Leviton Wiring Device Catalog D-200, Revision B—1 page advertisement, p. B2, entitled, "Dimmer Controls", showing Decora Touch Dimmers.
Leviton Wiring Device Catalog D-200, Revision B—1 page advertisement, p. F5, entitled, "Designer Line Devices", showing Decora Wallplates.
Home Center Magazine, Jul. 1985, p. 96—1 page advertisement for Paragon Electric Company, Inc., showing "Touch Command ® I", a Programmable Light Switch.
Siemens Electronic Light Dimmer Brochure for Model Nos. S 576 A, B, C and for Electronic Switch Model No. S 576 D, pp. 1-10.
LSI Computer Systems, Inc. Brochure entitled, "Touch Sensitive Light Dimmer/Switch", Model Nos. LS7231-LS7235, pp. 1-6, Model No. LS7237, pp. 1-4.

Primary Examiner—William M. Shoop, Jr.
Assistant Examiner—Shik Luen Paul Ip
Attorney, Agent, or Firm—Knobbe, Martens, Olson & Bear

[57] ABSTRACT

An improved touch control switch is adapted to be a direct replacement for a standard toggle switch in a standard single-gang or multi-gang switch box. The touch control switch includes a touch panel mountable on the outside of a standard wall plate and a touch control circuit mountable in the switch box on the inside of the wall plate. An electrically conductive path is provided through the standard rectangular opening in the wall plate to communicate an electrical signal from the touch plate to the touch control circuit. The touch panel is also movable in either of two vertical directions. The vertical movement of the touch panel is mechanically communicated through the opening in the wall plate to actuate an air-gap switch to provide positive disconnection of the electrical power from the a.c. source to the touch control circuit. An illuminated display device is provided to indicate when power is applied to the touch control circuitry and to indicate the location of the touch panel in a darkened room.

7 Claims, 13 Drawing Figures

U.S. Patent   Jun. 9, 1987   Sheet 1 of 4   4,672,229
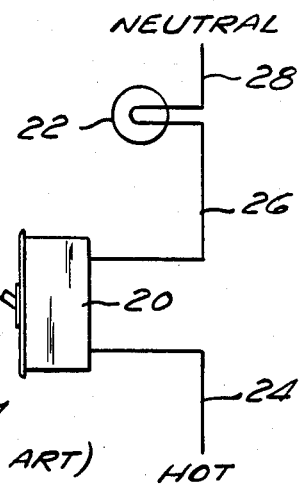
Fig. 1 (PRIOR ART)
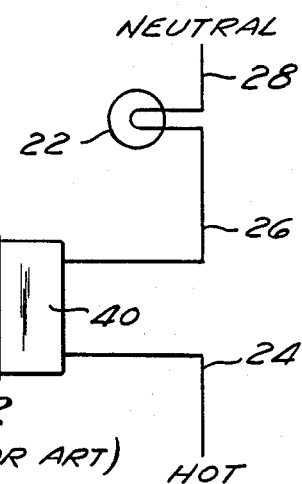
Fig. 2 (PRIOR ART)
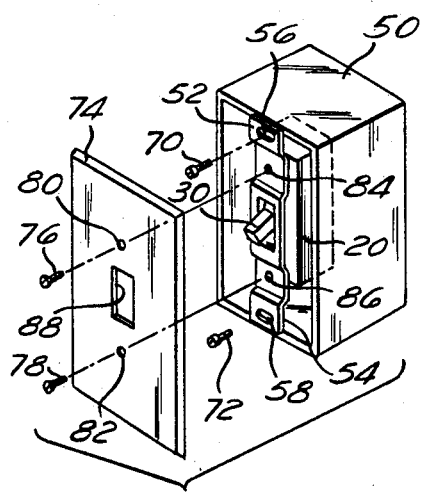
Fig. 3a (PRIOR ART)
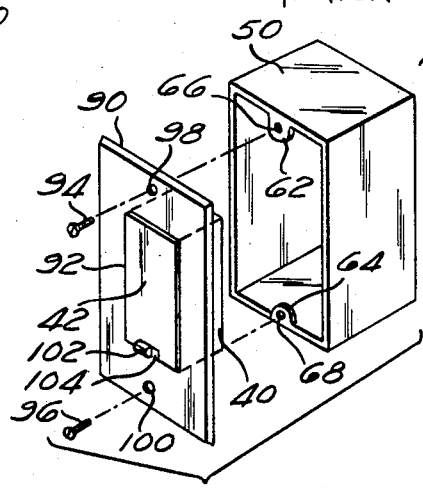
Fig. 3b (PRIOR ART)
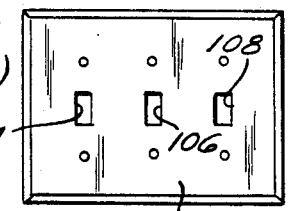
Fig. 3c (PRIOR ART)
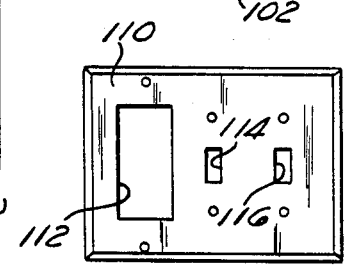
Fig. 3d (PRIOR ART)
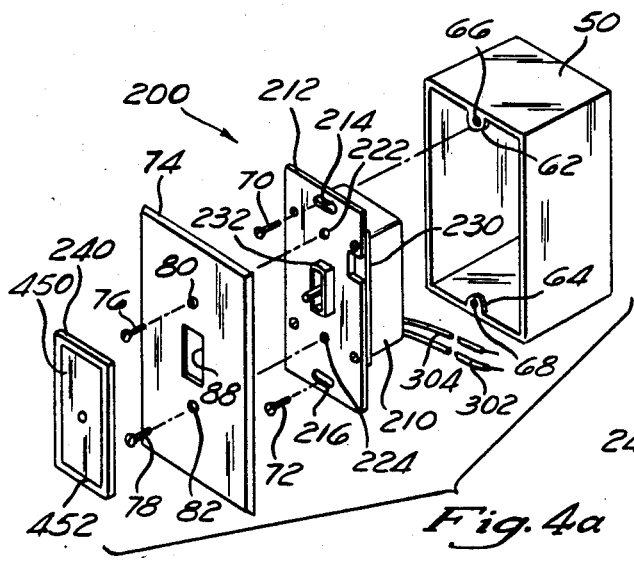
Fig. 4a
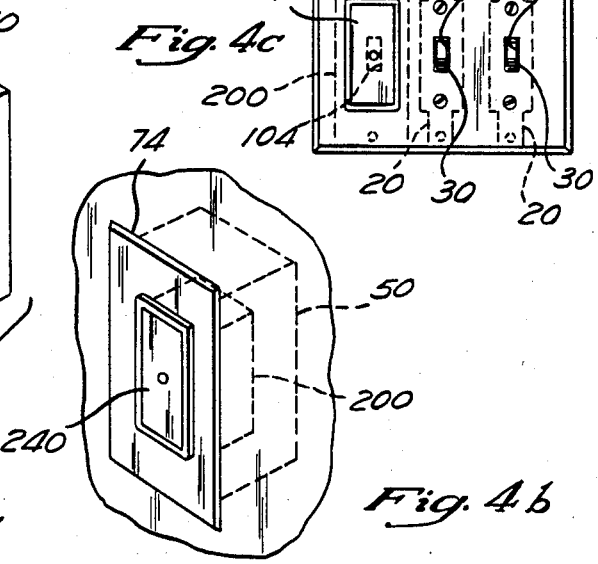
Fig. 4c
Fig. 4b

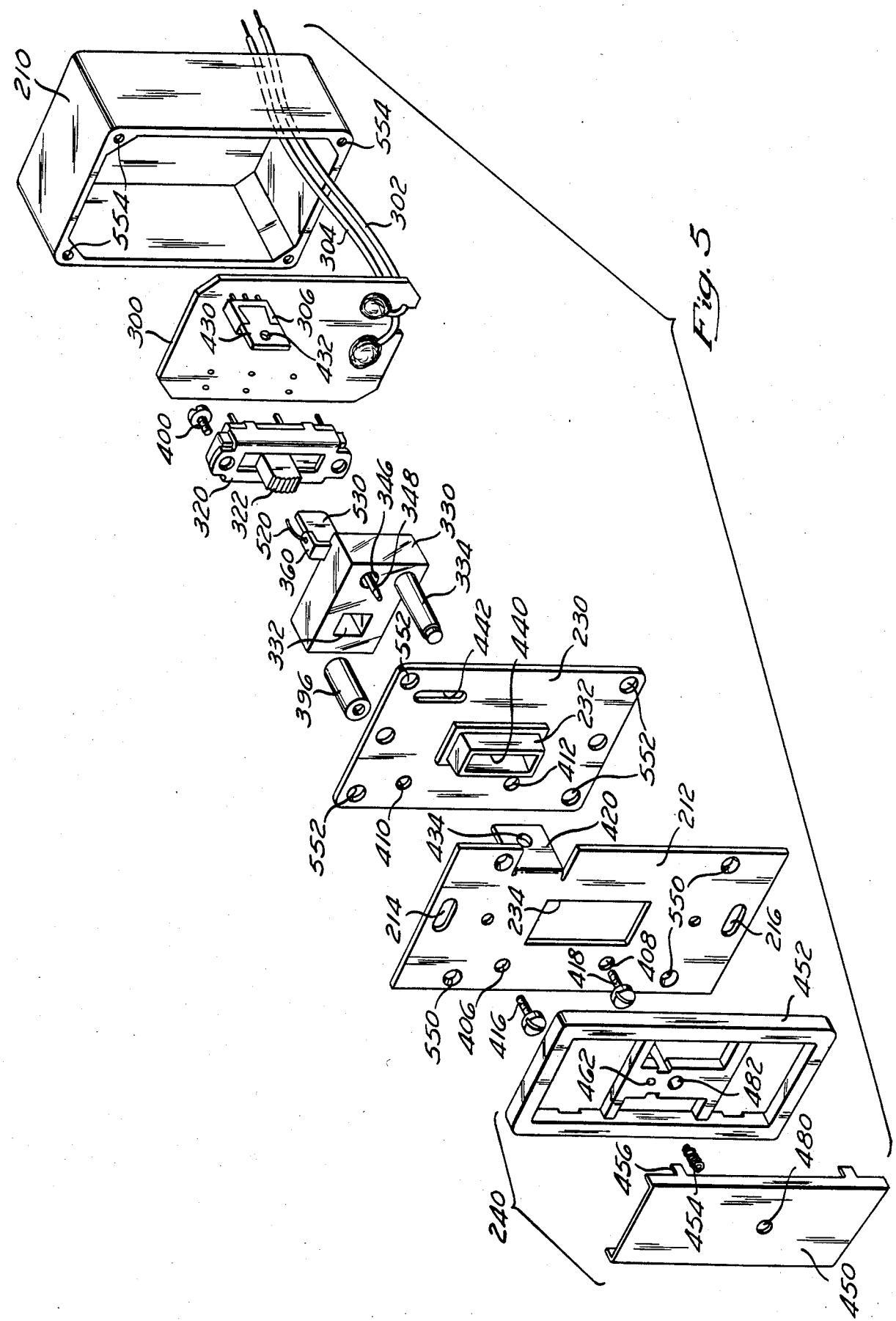

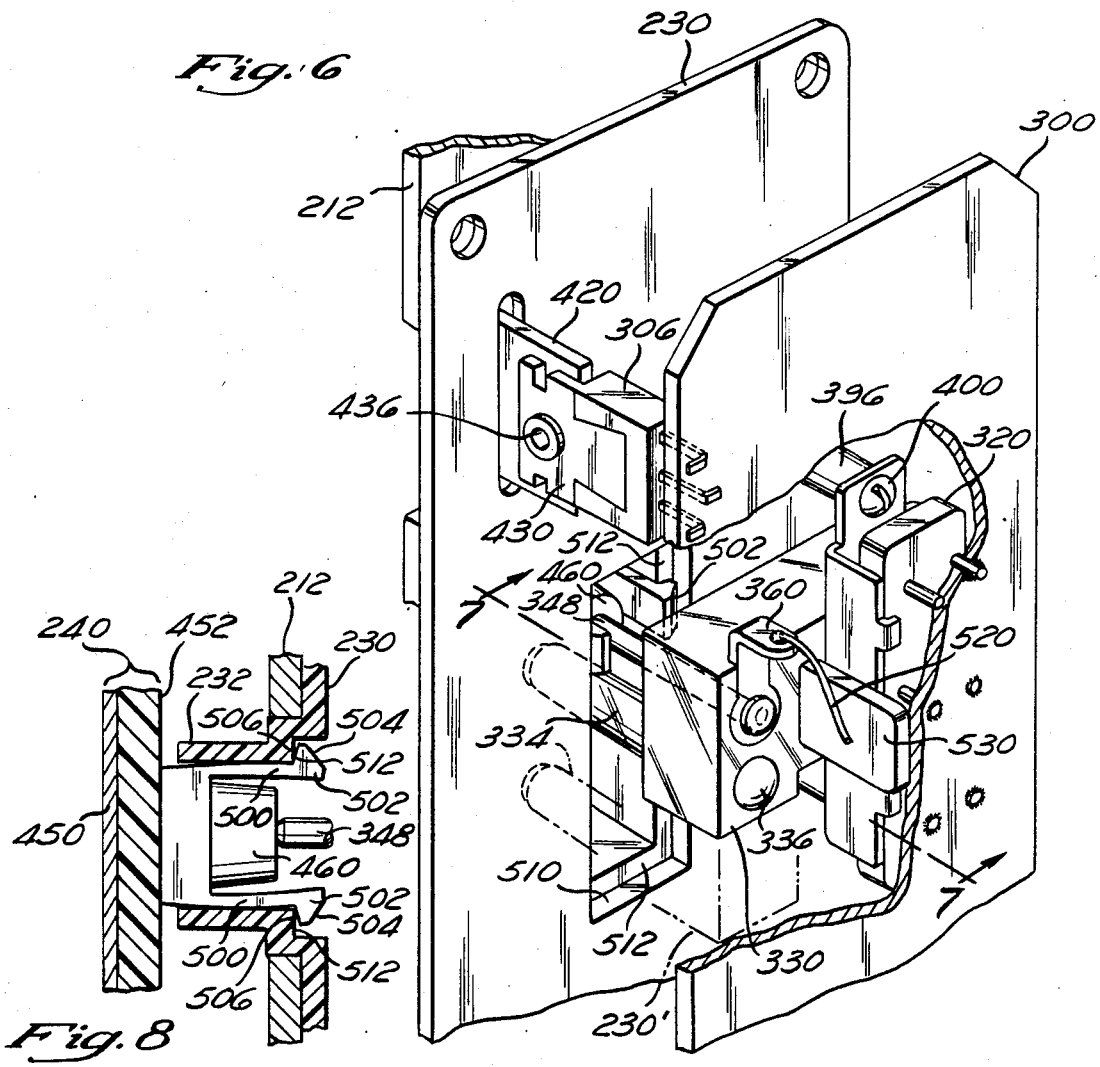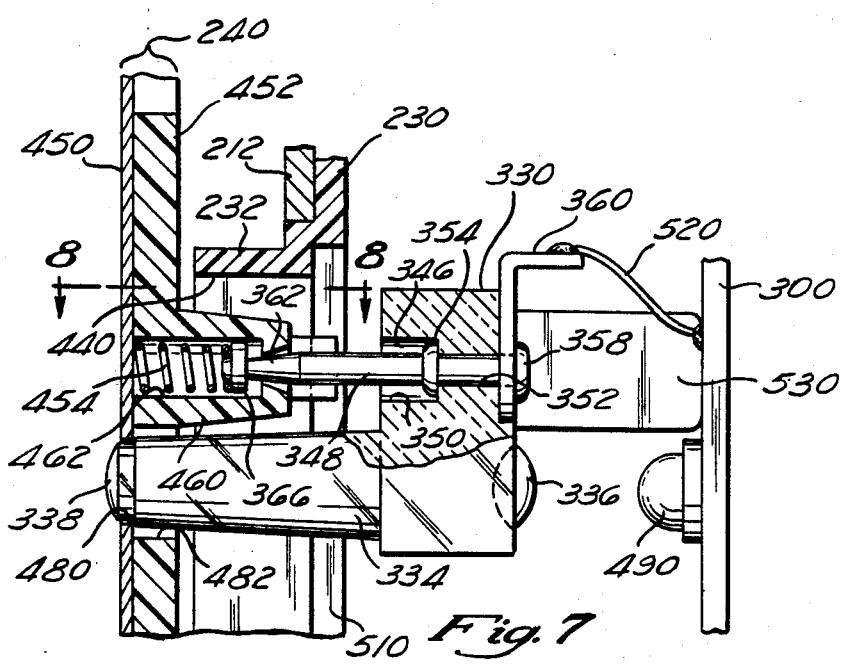

WALL-MOUNTED TOUCH CONTROL SWITCH

FIELD OF THE INVENTION

The present invention relates generally to lighting control devices, and, more particularly, to touch-responsive devices for controlling the intensity of an incandescent bulb.

BACKGROUND OF THE INVENTION

It is a desired feature in most homes and in many business to have at least one lighting fixture in which the intensity of the light generated by the fixture is controllable over a range of illumination. For example, many lamps include so-called trilight switches and a special light socket which allows the use of a special two-filament bulb to achieve three levels of illumination. In a different manner, overhead lighting fixtures, such as chandeliers and the like, are often connected to a wall mounted dimmer mechanism which allows the illumination produced by the overhead fixture to be varied over a wide range. Typically, the wall mounted dimmer control comprises a potentiometer which controls the phase angle of the a.c. power applied to the incandescent bulb or bulbs in the overhead fixture. Typically, the dimmer control includes a triac which is responsive to the phase angle control of an resistancecapacitance network that includes the potentiometer to thereby allow current to flow through the incandescent bulb during only a portion of each half-cycle of the a.c source.

Both the trilight switch in the lamp and the potentiometer controlled dimmer control in the wall are mechanical devices which suffer from failures after extended use. Furthermore, both devices require manual manipulation of the controls, and, in the case of persons having arthritis or other disabilities, are difficult to operate. Thus, a need has existed for devices to replace both types of lighting controls. In the case of the lamps, a number of devices have become available in the art to control the intensity of the incandescent bulbs in lamps. For example, U.S. Pat. No. 3,715,623 to Szabo teaches the basic principal of phase control of an incandescent bulb responsive to touch activation. Similarly, U.S. Pat. No. 4,119,864 to Petrizio teaches another version of a touch control circuit having additional levels of illumination. U.S. Pat. No. 3,805,096 to Hamilton discloses an alternative embodiment of a touch control circuit having on-off control as well as level control. Other circuits for controlling the intensity of incandescent bulbs are known. For example, LSI Computer Systems, Inc., Melville, N.Y., manufactures and sells a series of brightness control integrated circuits.

Although each of the foregoing prior art devices are electrically capable of providing touch-control of the brightness of an incandescent bulb, the circuits are not mechanically suitable for many applications. For example, in order to be approved by Underwriters Laboratories, any wall-mounted switch must include a means for positively disconnecting the a.c. power from the incandescent bulb. One cannot simply rely upon the on-off state of the touch control circuit described above. Thus, an air-gap switch must be provided in addition to the touch control circuit in order to meet the Underwriters Laboratories' requirements. (An air-gap switch is one having metallic electrical contacts which are separated by air or another insulating medium when the switch is its off position.)

There are presently a small number of lighting control devices available which provide touch control and also include an air-gap switch to meet the Underwriters Laboratories' requirements. However, the only switches presently available have peculiar mounting requirements which prevent them from being used as direct replacements for a standard wall-mounted on-off toggle switch. For example, Leviton Manufacturing Company, Inc. sells a touch dimmer which must be installed with a special wall plate having an opening having dimensions of approximately 2.6 inches by 1.3 inches, in contrast to the standard toggle switch opening of approximately 1 inch by 0.4 inches. Thus, in order to install the touch control dimmer from Leviton, a special wall plate must be purchased. If the touch control switch from Leviton is to be installed along side other standard switches, a special wall plate having an enlarged opening for the touch control switch and standard size openings for the normal switches must be purchased. One can readily see that a large number of specialized wall plates must be provided to provide the capability of installing the dimmer switches in various combinations with the standard wall switches. Thus, a need exists for a touch-control wall dimmer switch which can be installed as a direct replacement for a standard toggle switch using the opening in a standard wall plate.

SUMMARY OF THE INVENTION

The present invention is a wall-mounted, touch-control switch which can be installed as a direct replacement for a standard wall mounted toggle switch, utilizing a standard wall plate. The touch plate also serves as the actuator for a mechanical air-gap switch. The present invention is readily mountable in a standard single-gang or multi-gang switch box. The present invention is mounted in the switch box in the same manner as a conventional toggle switch. Thus, installation of the present invention requires no special tools or additional parts to adapt it for wall mounted installation. In the preferred embodiment, the touch panel is electrically connected to the touch control circuitry via a spring contact which is positioned in electrical contact with a first end of an electrically conductive pin. A second end of the electrically conductive pin is electrically connected to a touch control circuit on a printed circuit board. Thus, when the present invention is fully installed in a switch box, the touch panel is electrically connected to the touch control circuit via the spring contact and the pin.

The touch control circuitry is housed in an enclosure having a front mounting plate. The enclosure is mounted in the standard switch box and the front panel serves as the mounting surface for a standard wall plate in a conventional manner. After the standard wall plate is mounted to the present invention, the touch plate of the present invention is mounted on the outside of the wall plate by pressing the touch plate into an aperture of the mounting portion of the touch control circuitry. The touch control plate includes resiliently biased engaging members which serve to prevent the touch plate from disengaging from the aperture in the mounting portion. The resiliently biased engaging members have a beveled contact surface so that when sufficient pressure is applied to the touch plate in a direction away from the wall plate, the touch plate can be removed from the mounting portion of the touch control circuitry.

BRIEF DESCRIPTION OF THE DRAWINGS

FIG. 1 is a pictorial schematic diagram showing a standard toggle switch installed to control an incandescent bulb.

FIG. 2 is a pictorial schematic installation of a prior arT touch control switch installed in place of the toggle switch of FIG. 1 to control an incandescent bulb.

FIG. 3a illustrates a standard toggle switch installed in a standard switch box.

FIG. 3b shows a prior art touch control switch in position to be installed in a standard switch box.

FIG. 3c illustrates a standard multi-gang wall plate for use in installing three standard toggle switches.

FIG. 3d shows a multi-gang wall plate for use in installing a prior art wall dimming switch alongside standard toggle switches.

FIG. 4a illustrates the installation of the present invention in a standard wall-mounted electrical switch box.

FIG. 4b pictorially illustrates the present invention after being installed in the switch box of FIG. 4A.

FIG. 4c illustrates a front view of a standard multi-gang wall plate with the touch switch of the present invention installed alongside two standard toggle switches.

FIG. 5 is an exploded view of the present invention showing the interrelationships between the parts.

FIG. 6 is a partial cross-sectional view of the present invention showing the operation of the present invention in controlling the mechanical air-gap switch and also showing the electrical interconnection between the electrically conductive pin and the printed circuit board.

FIG. 7 is a partial cross-sectional view taken along the lines 7—7 of FIG. 6 showing the functional interrelationship between the pin and the spring biased contact in the touch control panel, and also showing the relationship between the LED on the printed circuit board and the light propagating member.

FIG. 8 is a partial cross-sectional view taken along the lines 8—8 in FIG. 7 showing the action of the mechanical latches on the front panel assembly that secure the front panel assembly to the switch guide.

DETAILED DESCRIPTION OF THE PREFERRED EMBODIMENT

Brief Review of the Prior Art

Figure 9:
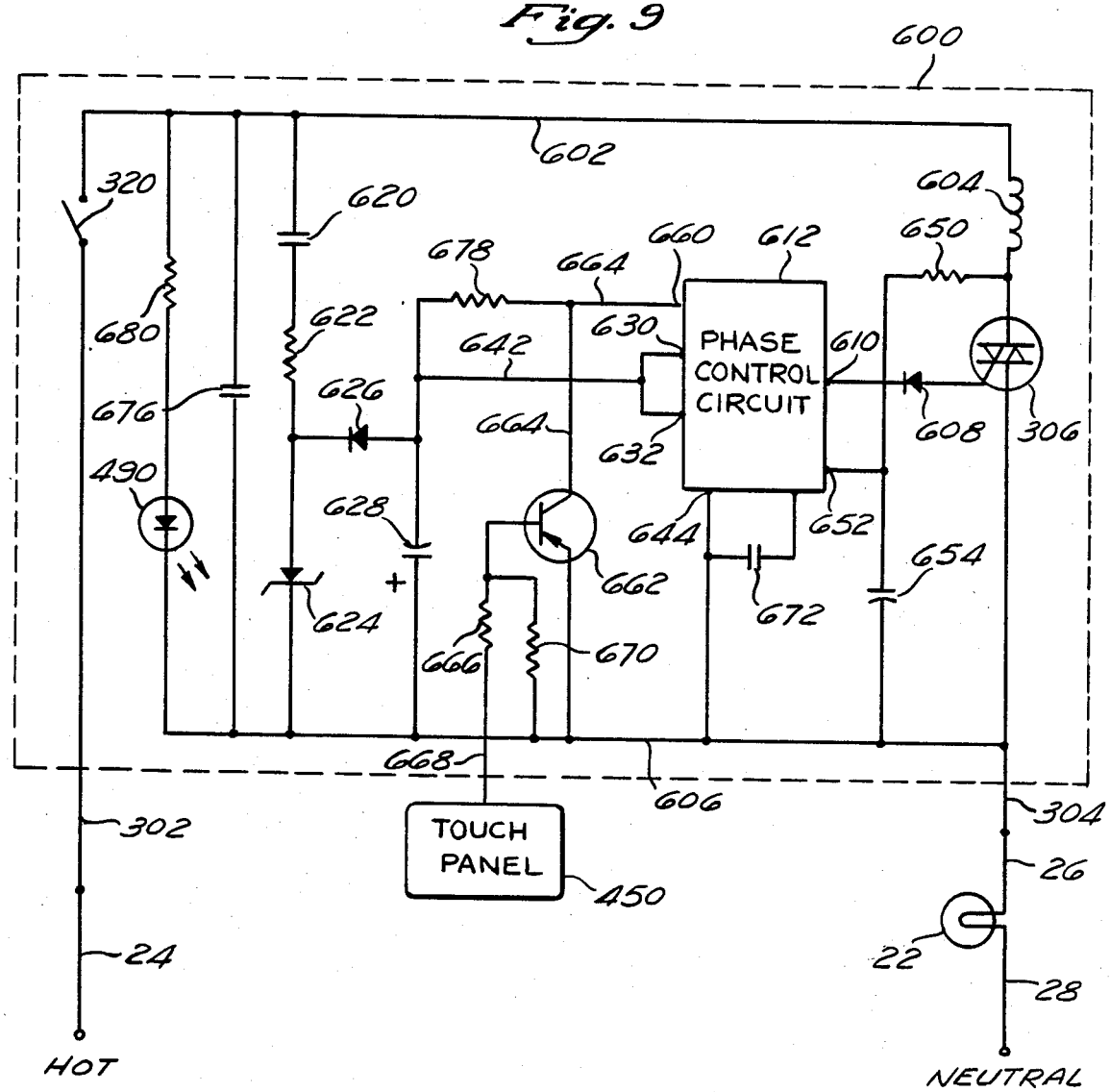
FIG. 9 is a schematic diagram of a preferred embodiment of the electrical circuitry on the printed circuit board of the present invention.

FIG. 1 is a pictorial illustration of a standard toggle switch 20 mounted in a wall to control an incandescent bulb 22. In typical installations, the toggle switch 20 has one connection to the hot side of the a.c. source via a wire 24. The other side of the toggle switch 20 is connected via a wire 26 to one lead of an electrical fixture which retains the incandescent bulb 22. A wire 28 leading from the incandescent bulb 22 provides a return path to the neutral of the a.c. source. The toggle switch 20 has an actuator 30 which typically toggles from an upper position (shown) to a lower portion and vice versa to selectively toggle the switch from an on-condition to an off-condition and vice versa. When the toggle switch 20 is in its off condition, an air-gap is formed between at least two contacts within the toggle switch 20 to prevent current from flowing from the wire 24 to the wire 26 and thus to the incandescent bulb 22. When the toggle switch 20 is actuated to its on condition, the contacts within the toggle switch 20 are brought together thus eliminating the air-gap between them and providing a current path from the wire 24 to the wire 26 and thus to the incandescent bulb 22. It is readily apparent that the toggle switch 20 only provides on-off control of the incandescent bulb.

FIG. 2 illustrates a conventional prior art installation of a touch control switch 40 as a replacement for the toggle switch 20 in FIG. 1. The touch control switch 40 is typically connected between the hot side of the a.c. source and the lamp 22 via the wires 24 and 26, as described above in connection with the toggle switch 20. The touch control switch 40 has a touch panel 42 which, when touched, triggers the operation of touch control circuitry contained within the touch control switch 40. The touch control circuitry of the switch 40 responds to touching of the touch panel 42 and controls the current flowing through the incandescent bulb 22. Unlike the toggle switch 20, the touch control switch 40 does not operate by selectively opening and closing an air-gap. Rather, the touch control switch 40 typically includes a triac or other gate-controlled semiconductor switch for controlling the amount of current flowing through the lamp 22. The touch control switch can provide on-off operations by selectively activating the triac within the switch 40. Generally, in the typical prior art installations, the touch control switch 40 also controls the phase angle at which the triac is activated to thereby control the amount of current flowing through the incandescent bulb 22 during each half-cycle of the a.c. source. Thus, the touch control switch 40 controls the brightness of the incandescent bulb 22. The operation of a touch control switch in controlling the brightness of an incandescent bulb is well known to the art.

FIG. 3a shown a typical installation of the conventional toggle switch 20 in a switch box 50. Although the toggle switch 20 is available from a large number of manufacturers, the toggle switch 20 has a conventional construction so that they are interchangeable. The toggle switch 20 has a first ear 52 and a second ear 54 which extend vertically and are spaced apart by a distance sufficient to span the vertical opening in the outlet 50. The ears 52 and 54 each have an elongated hole 56 and 58, respectively, which are used to mount the toggle switch 20 to the switch box 50. As shown in FIG. 3b, the switch box 50 has first and second tabs 62 and 64 which are spaced apart by substantially the same distance as the first and second elongated holes 56 and 58 in the ears 52 and 54 of the toggle switch 20. The first and second tabs 62 and 64 have first and second threaded holes 66 and 68, respectively, which are adapted to receive first and second switch mounting screws 70 and 72 that pass through the elongated holes 56 and 58 in the toggle switch 20 to secure the toggle switch 20 to the switch box 50, as illustrated in FIG. 3a. A wall plate 74 is secured to the toggle switch 20 by a pair of wall plate mounting screws 76 and 78 which pass through a pair of holes 80 and 82 in the face plate and are threaded into a pair of holes 84 and 86 in the toggle switch 20. Typically, the wall plate mounting screws 76 and 78 are color-coded to match the color of the wall plate 74. A substantially rectangular opening 88 is provided in the face plate 74 to accommodate the actuator 30 of the toggle switch 20 so that the actuator 30 is exposed when the wall plate 74 covers the toggle switch 20. Typically, the rectangular opening 88 is approximately 0.4 inch wide by 0.9 inch long (in the vertical direction). The elongated holes 56 and 58 in the toggle switch are elongated for a specific purpose. It is desirable that the wall plate 74 be mounted in a substantially vertical position so that the sides of the wall plate 74 are aligned with vertical door frames, window frames, and other structural or decorative features of a home or office. Since electricians are notorious for mounting electrical switch boxes and outlet boxes, such as the electrical switch box 50, in a non-vertical position, the elongated holes 56 and 58 allow the toggle switch 20 to be mounted at an angle with respect to the switch box 50 so that the holes 84 and 86 in the toggle switch 20 are aligned vertically. Thus, when the wall plate 74 is mounted to the toggle switch 20, it is properly aligned with other structural and decorative features. As is well known in the art, the dimensions of the wall plate 74 are such that the electrical outlet box 50 is not visible, and thus, the misalignment of the outlet box 50 is not apparent.

FIG. 3b illustrates a prior art touch control switch, such as the touch control switch 40 (FIG. 2), in position to be mounted into the electrical switch box 50 in the place of the toggle switch 20. As illustrated, the touch control switch 40 requires a special wall plate 90 having a large rectangular opening 92 through which the touch panel 42 of the touch control switch 40 is inserted. In the case of the Leviton touch control switch, the rectangular opening is approximately 1.3 inches by 2.6 inches. Thus, a standard wall place, such as the wall plate 74 in FIG. 3a cannot be used with the typical prior art touch control switch 40. The touch control switch 40 and the wall plate 90 are mounted by first attaching the touch control switch 40 to the wall plate 90 by screws or other means (not shown). Thereafter, the wall plate 90 is attached to the electrical outlet box 50 by inserting a pair of screws 94 and 96 through a pair of holes 98 and 100 in the wall plate 90 and into the holes 66 and 68 in the electrical outlet box 50. The screws 94 and 98 are typically color coded to match the color of the wall plate 90. One can readily see that for aesthetic reasons, holes 98 and 100 in the wall plate 90 cannot be elongated. Thus, when the wall plate 90 is mounted to the electrical switch box 50, the wall plate 90 must assume the same alignment as the electrical switch box 50. Thus, if the electrical switch box 50 is installed in a conventional manner (i.e., out of alignment with the vertical edges in a typical room in a home or office), then, the edges of the wall plate 90 will be out of alignment with the other features in the room which it is installed. This has been found to be a very aesthetically displeasing feature of these prior art touch control switches.

The touch switch 40 also includes an air-gap switch (not shown) which is actuated by an actuator 102 which is mounted in a slot 104 in the touch panel 42. The actuator 102 is small and somewhat difficult to operate. It also breaks the visual continuity of the touch panel 42 and is thus aesthetically undesirable.

As set forth above, a major problem with the prior art touch control devices is that a special wall plate 90 is required. Thus, if a standard toggle switch, such as the toggle switch 20 in FIG. 3a, is replaced with a touch control switch 40, a new wall plate 90 must be provided to replace standard wall plate 74 (FIG. 3a). Although this is not a great technical problem, it does add to the expense of installing touch control switches since the wall plate 90 will not be constructed in quantities nearly as large as the quantities in which the standard wall plates 74 are constructed. Furthermore, in many homes and other decorated areas, the wall plates are covered to match the surrounding wall coverings. Thus, the new nonstandard wall plate 90 must be covered to match the removed wall plates. This will most likely be more expensive and time consuming than the actual replacement of the toggle switch 20 with the touch control switch 40. In many cases, it may not be possible to find matching wall covering. Thus, many persons may forego the use of the touch control switch 40 irrespective of its light controlling advantages rather than install a wall plate 90 which does not match the wall covering. The old wall plate 74 must be discarded or, in the case of a specially decorated wall plate, stored for future use. This problem is magnified further when one considers multi-gang switch enclosures and enclosures in which lighting controls are mounted alongside receptacles. A multi-gang switch enclosure is one in which two or more switches are mounted in side-by-side relationship in an elongated switch box. Typically, a wall plate is provided which has mounting positions for each of the toggle switches in the switch box. For example, FIG. 3c illustrates a wall plate 122 having three openings 124, 126, and 128 to accommodate the actuators of three toggle switches (not shown). Other wall plates accommodating up to six toggle switches are readily available from a number of manufacturers and larger wall plates accommodating even more toggle switches are commercially available on special order. In contrast, FIG. 3d illustrates a wall plate 130 which is adapted to accommodate a dimmer switch, such as the dimmer switch 40 in FIG. 3b, in a large opening 132. The wall plate 130 has a standard opening 134 and a standard opening 136 to accommodate standard toggle switches. For example, Leviton Manufacturing Company, Inc. manufactures wall plates such as that illustrated in FIG. 3d. However, if an additional dimmer switch needs to be installed, the wall plate 130 in FIG. 3d cannot be used and must be replaced with a wall plate having two large openings to accommodate the dimmer switches. Furthermore, if it is desired to position a dimmer switch in the middle position between the two standard toggle switches, the wall plate 130 cannot be used. Although this may not appear to be a great problem, it is often desirable to position the switches with respect to each other to reflect the positioning of the controlled fixtures with respect to each other in a room or in various parts of a building. Thus, one can see that at least five different wall plates must be provided to accommodate each of the eight possible combinations of touch switches and toggle switches in a three-position switch enclosure. If the number of switches in a switch enclosure is increased, the number of combinations of wall plates which must be provided increases substantially. Thus, a need exists for a touch switch which can be used as a direct replacement for a standard toggle switch so that special wall plates are not required to install the touch switch.

DESCRIPTION OF THE PRESENT INVENTION

FIG. 4a illustrates a prospective view of a touch control switch 200 constructed in accordance with the present invention and positioned for installation into a conventional switch box 50. The touch control switch 200 includes an enclosure 210 which houses the electronics, to be described below. The enclosure 210 is mounted to a mounting plate 212. The mounting plate 212 includes a first elongated hole 214 and a second elongated hole 216 which serve the same purpose as the elongated holes 56 and 58 in the standard toggle switch 20 described above in connection with FIG. 3a. Therefore, the mounting plate 212 can be mounted to the tabs 62 and 64 of the electrical switch box 50 using the screws 70 and 72 in precisely the same manner as the toggle switch 20. Thus, the mounting plate 212 can be adjusted to a substantially vertical position, irrespective of any reasonable misalignment of the electrical switch box 50 with respect to vertical.

The mounting plate 212 further includes a first threaded hole 220 and a second threaded hole 222 which are adapted to receive the screws 76 and 78 to thereby secure the standard wall plate 74 to the mounting plate 212 after the mounting plate 212 is secured to the electrical switch box 50. The mounting plate 212 is secured to a switch guide 230 which is positioned between the mounting plate 212 and the enclosure 210. The switch guide 230 has a central portion 232 which extends through an opening 234 in the mounting plate 212 and is positioned to extend through the opening 84 in the wall plate 74 when the wall plate 74 is secured to the mounting plate 212. The switch 200 further includes a touch panel assembly 240 which is slideably attached to the switch guide 230 after the wall plate 74 is secured to the mounting plate 212. A complete description of the assembly and operation of the switch 200 will be set forth below in connection with FIGS. 5-9.

The completed switch assembly mounted on the enclosure 50 is illustrated in FIG. 4b. As illustrated, the completed structure is aesthetically pleasing as well as functional. One particular advantage of the structure described herein is that the touch panel assembly 240 covers the screws 76 and 78 which secure the face plate 74 to the switch 200. As will be described below, the touch panel assembly 240 also serves as an actuator for an airgap switch (not shown).

FIG. 4c illustrates the touch control switch 200 of the present invention installed in a three-gang switch box (not shown) alongside two standard toggle switches 20. The three switches are covered and protected by a standard three-gang wall plate 102 identical to the wall plate 102 described with respect to FIG. 3c. The standard rectangular opening 104 (in phantom) accommodates the central portion 232 (not shown) of the touch control switch 200 so that the touch control switch 200 can be mounted in the switch box as a direct replacement for a toggle switch 20. Thus, a special wall plate is not required to install the touch control switch 200 of the present invention in a multi-gang switch box. Therefore, a standard wall plate which has been decorated to match the surrounding wall covering, or the like, can continue to be used when the touch-control switch of the present invention replaces a standard toggle switch.

FIG. 5 is an exploded view of the touch switch 200 of the present invention. As set forth above, the touch switch 200 is housed in enclosure 210. The electronic circuitry of the touch switch 200 is installed on a printed circuit board 300 which has horizontal and vertical dimensions selected to fit within the enclosure 210. For clarity, the electronic circuitry is not shown in FIG. 5, but will be described below in connection with FIG. 9. As illustrated in FIG. 5, a pair of wires 302 and 304 are electrically connected to the printed circuit board 300 to provide electrical power to the printed circuit board 300. The wires 302 and 304 can be connectable to the hot side of the a.c. source and to the switched incandescent bulb in a conventional manner, (e.g., by wire nuts, or the like). Thus, the wires 302 and 304 can be connected to the wires 24 and 26 in FIG. 1 or FIG. 2. The printed circuit board 300 also includes a triac 306 which is a gate-controlled semiconductor switch for controlling the electrical connection between the wire 302 and the wire 304 as will be explained in further detail below. The particular mounting configuration of the triac 306 in the present invention will also be discussed in more detail below.

The switch assembly 200 of the present invention further includes a conventional slide switch 320 which has internal electrical contacts to provide the positive onoff air-gap switching required by Underwriters Laboratories. The switch 320 is preferably directly mounted to the printed circuit board 300 by soldering or other conventional methods. Thus, the electrical connections to the switch 320 are provided on the printer circuit board 320. The switch 320 includes a slideable actuator 322 which is moveable vertically (when positioned as shown in FIG. 5) between two or more positions to selectively make and break the electrical contacts within the switch 320.

The present invention further includes a switch adaptor 330 which is a block of plastic or other insulating material. The switch adaptor 330 has a first aperture 332 that passes through the adaptor 330. The aperture 332 is adapted to receive the actuator 322 of the switch 320. Thus, the actuator 322 of the switch 320 will be caused to move when the adaptor 330 is moved in either of the two vertical directions. The switch adaptor 330 further includes a post 334 which is mounted perpendicular to the switch adaptor 330. In the preferred embodiment, the post 334 is constructed from a clear material which propagates light. The post 334 is shown in more detail in FIG. 7. As illustrated in FIG. 7, the post 334 extends through the switch adaptor block 330. The post 334 has a first end 336 which is adapted to receive light. Any light received at the first end 336 propagates through the post 334 to a second end 338 and is radiated from the second end 338. The purpose for propagating light through the post 334 will be explained below.

Returning to FIG. 5, the switch adaptor 330 further includes a second aperture 346 that passes through the switch adaptor 330. The second aperture 332 is adapted to receive an electrically conductive pin 348 which passes through the aperture 332, as illustrated more clearly in FIG. 7. As illustrated in FIG. 7, the second aperture 346 has a first portion 350 having a first diameter and has a second portion 352 having a second diameter, smaller than the first diameter. The pin 348 has an annular ring 354, which has a diameter smaller than the first diameter of the first portion 350 of the aperture 346 but larger than the second diameter of the second portion 352 of the aperture 346. Thus, the pin 348 fits into the second portion 352 of the aperture 348 up to the annular ring 354. A first end 358 of the pin 348 passes through the switch adaptor 330. A conventional solder lug 360, having a hole therein, is positioned around the end 358 of the pin 348. The end 358 of the pin 348 is swaged to secure the pin 348 within the aperture 346 and to also tightly secure the solder lug 360 to the pin 348 to provide a low-resistance electrical connection between the solder lug 360 and the pin 348. The pin 348 has a second end 362, opposite the first end 358, which extends above the switch adaptor 330. The pin 348 thus forms an electrically conductive path from the solder lug 360 to the second end 362.

The switch guide 230 is shown in more detail in FIG. 5. The switch guide 230 is a substantially flat plate which has the central portion 232 mounted perpendicular to the flat portion to extend through the opening 234 in the mounting plate 212 and the opening 84 in the wall plate 74, as illustrated in FIG. 4a. The perpendicular central portion 232 serves to help align the wall plate 74 with respect to the switch 200 and also serve as a guide for the touch panel assembly 240, as will be explained in more detail below.

The mounting plate 212 is also shown in more detail in FIG. 5. The opening 234 is positioned substantially in the center of the mounting plate 212 and has a generally rectangular configuration. The opening 234 is sized and dimensioned to receive the perpendicular central portion 232 of the switch guide 230. The mounting plate 212, the switch guide 230, the switch adaptor 330, the switch 320 and the printed circuit board 300 are connected together as a single unit during assembly. The primary means of connection is provided by a pair of mounting holes 390 and 392 which are provided as part of the switch 320. A first internally threaded cylindrical standoff 394 and a second internally threaded cylindrical standoff (not shown) are aligned with the holes 390 and 392 in the switch 320. A first switch mounting screw 400 and a second switch mounting screw (not shown) secure the switch 320 to the first standoff 396 and to the second standoff. A pair of holes 406 and 408 are provided in the mounting plate 212. A pair of holes 410 and 412 are provided in the switch guide 230 in alignment with the holes 406 and 408 of the mounting plate 212. A first plate mounting screw 416 passes through the holes 406 and 410 into the standoff 396 to thereby secure one end of the switch 320 to the mounting plate 212. A second plate mounting screw 418 passes through the holes 408 and 412 into the second standoff (not shown) to secure the second end of the switch 320. Since the switch 320 is secured to the printed circuit board 300, the mounting process just described also provides a mechanical interconnection between printed circuit board 300 and the mounting plate 212 to secure the printed circuit board 300 in fixed relationship to the mounting plate 212 via the switch 320. The mounting plate 212 further includes a tab 420 which is positioned perpendicular to the mounting plate 212. In the preferred embodiment, the tab 420 is formed from a portion of the mounting plate 212. The tab 420 passes through a slot 422 in the switch guide 230 and extends towards the printed circuit board 300. When the printed circuit board 300 is secured as described above, the triac 306 is positioned proximate to the tab 420. The triac 306 has a heat sink portion 430 which has a mounting hole 432 formed therein. The tab 420 of the mounting plate 212 has a corresponding hole 434 which is positioned in alignment with the hole 432 in the heat sink 430 of the triac 306. The heat sink 430 of the triac 306 is secured to the tab 420 of the mounting plate 212 using a rivet 436 (FIG. 6) or by using another conventional fastening method. The triac 306 is soldered to the printed circuit board 300 to provide electrical connections thereto and also to mechanically secure the triac 306 to the circuit board 300. Thus, the mechanical connection between the triac 306 and the tab 420 provides a second mechanical interconnection between the printed circuit board 300 and the mounting plate 212 to hold the printed circuit board 300 in fixed relationship to the mounting plate 212. In addition, the tab 420 conducts heat away from the triac 306 and to the mounting plate 212 which is a thermally conductive material. The size of the mounting plate 212 is substantially greater than the size of the heat sink 430 of the triac 306. Thus, the mounting plate 212 serves to dissipate the heat generated by the triac 306 during normal operation.

When the switch 320 is mounted to the mounting plate 212 and the switch guide 230, the switch adaptor 330 is positioned between the switch 320 and the switch guide 230 so that the switch actuator 322 fits within the aperture 332 in the switch adaptor 330. The light propagating post 334 and the electrically conductive pin 346 on the switch adaptor 332 are positioned such that they fit within an aperture 440 in the perpendicular central portion 232 of the switch guide 230. The switch adaptor 330 is thus moveably positioned between the switch 320 and the switch guide 230. Movement of the switch adaptor 330 moves the switch actuator 322, and thus makes and breaks the electrical contacts within the switch 320. As shown more clearly in FIG. 7, the light propagating post 334 extends through and beyond the perpendicular central portion 232 of the switch guide 230. Thus, a force applied to the post 334 in a vertical direction will be transmitted to the switch adaptor 330 and thus to the switch actuator 322 to move the switch actuator 322 to thereby open or close the electrical contacts within the switch 320. As will be set forth below, the touch panel assembly 240 is mechanically connected to the post 334 so that movement of the touch panel assembly 240 in the vertical direction is transmitted through the post 334 and the switch adaptor 330 to cause movement of the switch actuator 322.

Returning again to FIG. 5, the touch panel assembly 240 comprises an electrically conductive metallic touch panel 450, an insulating touch panel frame 452, and an electrically conductive spring 454. The touch panel 450 has four tabs 456 (only two shown) which provide a means for securely attaching the touch panel 450 to the frame 452. In the preferred embodiment, the touch panel 450 fits within the frame 452 so that the outer surface of the touch panel 450 is flush with the exposed sides of the frame 452.

As shown in FIG. 7, the frame 452 has a raised central position 460 which faces away from the touch panel 450. The raised central portion 460 of the frame 452 has a central aperture 462 which is adapted to receive the spring 454. When the touch panel 450 is assembled to the frame 452, the spring 454 is inserted within the aperture 462 and held within the aperture 462 in a compressed state by the touch panel 450. In the preferred embodiment, the spring 454 presses against an electrically conductive disk 466 which is positioned in the aperture 462 away from the touch panel 450. The raised portion 460 has a second aperture 470 which extends into the first aperture 462. The second aperture 470 has a smaller diameter than the first aperture 462. The disk 466 prevents the spring 454 from passing through the second aperture 470.

The touch panel assembly 240 is positioned proximate to the mounting plate 212 so that the electrically conductive pin 348 passes through the second aperture 470 and presses against the electrically conductive disk 466. Thus, an electrically conductive path is provided from the solder lug 360, through the electrically conductive pin 348, through the electrically conductive disk 466, through the electrically conductive spring 454 to the electrically conductive touch panel 450. The compressive force of the spring 454 forces one end of the spring 454 against the touch panel 450 and the other end of the spring 454 against the disk 466. The compressive force of the spring 454 also presses the disk 466 against the end 362 of the pin 348 to assure good, low-resistance electrical contact between the components in the electrically conductive path. The solder lug 360 is electrically interconnected to the printed circuit board 300 by an electrically conductive wire 520 to complete an electrically conductive path from the touch panel 450 to the printed circuit board 300.

The touch panel 450 has an aperture 480 which is aligned with an aperture 482 in the frame 452. When the touch panel assembly 240 is assembled to the switch guide 230, the second end 338 of the light propagating post 334 fits through the aperture 482 in the frame 452 and into the aperture 480 in the touch panel 450. The light propagating rod 334 is used for two purposes. The primary purpose of the rod 334 is to conduct force from the front panel assembly 240 to the switch adaptor 330 to the switch 320. When an upward directed force is applied to the front panel assembly 240, the front panel assembly 240 is pushed upward to the relative position shown in FIGS. 6 and 7. When a downwardly directed force is applied to the touch panel assembly 240, the switch adaptor 330 is pushed downward to a location indicated in FIG. 6 by phantom lines and designated as 330. The switch adaptor 330 thus propagates the upward and downward movement of the touch panel assembly 240 to movement of the switch actuator 322 (FIG. 5) of the switch 320. Thus, a separate actuator is not required as in the prior art devices (for example, the actuator 102 in FIG. 3d). As shown in FIG. 7, the printed circuit board 300 supports a light emitting diode (LED) 490 which has power applied to it when power is applied to the touch control circuitry on the printed circuit board 300 by closing the contacts in the switch 320. When the switch adaptor 330 is positioned as shown in FIG. 7, the first end 336 of the light propagating rod 334 is aligned with the LED 490. The light emitted from the LED 490 when power is applied to the printed circuit board 300 propagates through the light propagating rod 334 and is radiated at the second end 338 of the light propagating rod 334. Thus, the light propagating rod in combination with the LED 490 provides a visible indication that power is supplied to the printed circuit board 300.

Referring now to FIG. 8, the frame 452 further includes a pair of mechanical latches 500 which are horizontally positioned on opposing sides of the raised central portion 460. The mechanical latches 500 are constructed from a resilient material and are biased horizontally away from the raised portion 460. The latches 500 are spaced apart from each other such that the distance between the outer portions of each latch 500 is substantially equal to the width of the aperture 440 in the perpendicular central portion 232 of the switch guide 230. Each of the latches 500 has an enlarged end portion 502 which is disposed away from the main body of the frame 452. Each of the enlarged end portions 502 has a first beveled surface 504 facing away from the main body of the frame 452 and has a second facing surface 506 facing toward the main body of the frame 452. The raised portion 460 of the frame 452 is tapered so that the latches 500 can be bent inwardly against the raised portion 460 so that the end portions 502 can be inserted into the aperture 440 of the perpendicular central portion 232 of the switch guide 230. The beveled first surfaces 504 of the enlarged end portions 502 of the latches 500 act as wedges to push the end portions 502 together so that the end portions 502 can be inserted into the aperture 440. The switch guide 230 has an opening 510 which is aligned with the aperture 440 in the perpendicular central portion 232 and which has a width which is larger than the width of the aperture 440. The perpendicular central portion 232 has an end 512 which forms a ledge 512 within the opening 510. After passing through the aperture 440, the enlarged end portions 502 of the mechanical latches 500 flex outwardly into the opening 510 and are restrained therein by the ledge 512 formed by the end 512 of the perpendicular central portion 232. The beveled second surfaces 506 of the enlarged ends 502 provide a means so that the enlarged ends 502 can be withdrawn from the opening 510 by applying a small amount of pressure to the front panel assembly 240. As shown in FIGS. 6 and 8, the interaction of the latches 500 against the inner surface of aperture 440 serves as a guide for the movement of the front panel assembly in the vertical direction.

In the preferred embodiment, the switch adaptor 330 further includes a tab 530 which extends perpendicular to it. The tab 530 presses against the printed circuit board 300 so that the movement of the switch adaptor 330 in the horizontal direction is limited by the printed circuit board 300. Therefore, the electrically conductive pin 348 is maintained in good mechanical contact against the electrically conductive disk 466 and thus the disk 466 is forced against the spring 454.

When assembled as described above, the touch panel assembly 240 serves as an extension of the actuator 322 of the switch 320 so that the front panel assembly 240 can be moved vertically to selectively open and close the electrical contacts within the switch 320. The ability to open and close the air-gap switch 320 by moving the touch panel assembly 240 assures that the present invention is in compliance with the Underwriters Laboratories' requirement referred to above. The on-off switching capacity is provided without the additional switch actuator required by the prior art devices.

The light emitted by the LED 490 (FIG. 7) and propagated to the front panel 450 via the light propagating rod 334 provides a means for indicating that the power has been applied to the printed circuit board 300 and thus indicates that the present invention is operable as a touch control switch. If the light is not visible through the light conducting rod 334, the front panel assembly 240 is in the improper position and should be pushed upwards to activate the printed circuit board 300. The light emitted through the light propagating rod 334 also advantageously serves a secondary purpose of enabling one to find the touch panel 450 in a dark room.

Returning to FIG. 5, the mounting plate 212 has four holes 550 which are aligned with four holes 552 in the switch guide 230. The holes 550 and the holes 552 are aligned with four threaded holes 554 in the enclosure 210. The enclosure 210 is secured to the mounting plate 212 by four flat head screws (not shown) inserted through the holes 550 and 552 and into the threaded holes 554. When assembled, the elongated holes 214 and 216 on the mounting plate 212 extend above and below the mounting plate 212 as shown in FIG. 4a.

Once the circuitry on the/printed circuit board 300 is activated by pushing the front panel assembly 240 in the upward position and closing the air-gap contacts within the switch 320, the present invention operates as a conventional touch control switch. Touching the front panel 450 causes the touch control circuitry 330 to change the state of the power applied to the incandescent bulb 22 (FIG. 2). In the preferred embodiment, a momentary touch (32 milliseconds to 332 milliseconds) on the front panel 450 turns off the incandescent bulb if it is on or turns the bulb on if it off. A prolonged touch (more than 332 milliseconds) on the front panel 450 causes the light intensity of the incandescent bulb to change.

FIG. 9 is a schematic diagram of an exemplary circuit used with the present invention to provide the touch control action. Like numbers in FIG. 9 indicate elements which have been described above. Those portions of the circuitry mounted on the printed circuit board 300 are enclosed in dashed lines 600. As set forth above, one contact of the switch 320 is connected to the hot side of the a.c. source via the wire 302. A second contact of the switch is connected to a hot bus 602. When the switch 320 is closed, a.c. power is applied to the circuitry on the hot bus 602. The power on the hot bus 602 is applied through an inductor 604 to one electrode of the triac 306. The wire 304, which is connectable to the wire 26 leading to the incandescent bulb 22, is connected to a switched bus 606. The second electrode of the triac 306 is also connected to the switched bus 606. When the triac 306 is activated, the power on the bus 602 through the inductor 604 is connected to the bus 606. Therefore, an electrically conductive path is provided from the hot line 302 to the switched line 304 and thus to the incandescent bulb 22 via the line 26. As is well-known to the art, conduction of the triac 306 is controlled by a signal applied to its gate. In the circuit 600 the gate of the triac 306 is connected to the anode of a diode 608 which has its cathode connected to an output 610 of a phase control circuit 612. In the preferred embodiment, the phase control circuit 612 is a touch sensitive light dimmer circuit available from LSI Computer Systems, Inc., 1235 Walt Whitman Road, Melville, N.Y. 11747. The phase control circuit 612 is designated by one of the model numbers LS7231, LS7232, LS7233, LS7234 or LS7235, depending upon dimming action required. Other phase controls circuits from other manufacturers can be used.

The phase control circuit 612 receives power from the hot bus 602 and the switched bus 606 via a power supply circuit which includes a capacitor 620, a resistor 622, a Zener diode 624, a diode 626, and a capacitor 628. The capacitor 628 is connected to the switched bus 606. At the beginning of each half-cycle of the a.c. source, there is a short duration of time during which the triac 306 is not conducting even when the phase control circuit 612 is set for the maximum brightness level. In the half-cycle, when the voltage potential on the switched bus 606 is more positive than the voltage potential on the hot bus 602, the capacitor 628, will charge via the diode 626, the resistor 622 and the capacitor 620. The capacitor 628 will charge to a voltage which is clamped by the Zener diode 624. The common connection between the capacitor 628 and the anode of the diode 626 is connected to an input 630 and an input 632 of the phase control circuit 612 via a line 642. The input 632 is the negative voltage power input of the phase control circuit 612 and the input 630 is a sensor extension input that is not active in the present invention. An input 644 of the phase central circuit 644 is attached to the switched bus 606. Thus, a voltage is applied to the inputs 630 and 632 of the phase control circuit 612 on the line 642 which is at a negative potential with respect to the voltage applied to the input 644. This voltage is sufficient to operate the phase control circuit 612. The Zener diode 624 prevents the voltage on the capacitor 628 from increasing to a level greater than a maximum operating voltage of the phase control circuit 612 when the triac 306 does not conduct during any part of the half-cycle of the a.c. source. The capacitor 628 acts as a filter capacitor to sustain the voltage between the input 644 and the inputs 630 and 632 during the half cycle when the switched bus 606 is negative with respect to the hot bus 602.

The circuit 600 further includes a resistor 650 which has a first end connected to the common connection between the inductor 604 and the triac 306. A second end of the resistor 650 is connected to an input 652 of the phase control circuit 612. The input 652 of the phase control circuit 652 is also connected to one end of a capacitor 654. The other end of the capacitor 654 is connected to the switched bus 606. The voltage applied to the phase control circuit 612 through the resistor 650 is responsive to the magnitude of the a.c. voltage applied between the bus 602 and the bus 606. The phase control circuit 612 senses when the a.c. input voltage has a substantially zero magnitude (i.e., when the a.c. source is at zero-crossing at the beginning of each half-cycle) and initiates an internal delay from the sensed zero-crossing time. After the delay time has elapsed, the phase control circuit 612 generates an output signal on the output 610 through the diode 608 which triggers the triac 306 to connect the hot side of the a.c. source to the incandescent bulb 22. Thus, the phase control circuit 612 provides a phase delay from zero-crossing. The phase delay is determined by an internal counter within the phase control circuit 612. The count of the internal counter is determined by a touch activated input on an input 660 which is connected to the collector of a transistor 662 via a line 664. The base of the transistor 662 is connected to the front panel 450 through a resistor 666 and a circuit path 668. The base of the transistor 662 is biased by a resistor 670 connected between the base and the switched bus 606. One skilled in the art will recognize that the circuit path 666 represents the wire 520, the solder lug 360, the electrically conductive pin 348, the electrically conductive disk 466, and the electrically conductive spring 454 which interconnect the circuit board 300 and the touch panel 450 as illustrated in FIG. 7. When the touch panel 450 is touched, the bias on the transistor 662 changes and a signal is applied to the input 660 of the phase control circuit 612 through via the line 664. The phase control circuit 612 responds to the signal on the input 660 and either changes the count of the internal counter if the pulse has a sufficient duration (e.g. greater than 332 milliseconds) or changes the on-off condition of the phase circuit 612 if the touch applied to the touch plate 450 is of a short duration (e.g., 32 milliseconds to 332 milliseconds).

A capacitor 672 is provided between an input 674 of the phase control circuit 612 and the switched bus 606 to provide filtering for a phase-locked loop internal to the phase control circuit 612. A capacitor 676 is connected between the hot bus 602 and the switched bus 606 and operates in conjunction with the inductor 604 to provide RF filtering of the currents caused by switching the triac 306. A resistor 678 is connected from the input 660 to the line 642 and is included to adjust the sensitivity of the input 660 to touches on the touch panel 450. Full details of the operation of the phase control circuit 612 can be found in the specification sheet for LS7231-LS7235, Touch Sensitive Light Dimmer/Switch, available from LSI Computer Systems, Inc., 1235 Walt Whitman Road, Melville, N.Y. 11747.

The circuit 600 further includes a resistor 680 which interconnects the anode of the light emitting diode 490 to the hot bus 602. The cathode of the light emitting diode 490 is connected to the switched bus 606. When power is applied to the circuit 600 by closing the switch 320, current flows through the resistor 680 to the light emitting diode 490 and causes the light emitting diode to emit light. The emitted light is conducted through the light propagating post 334 shown in FIG. 7.

One skilled in the art will recognize that the amount of current required to operate the light emitting diode 490, the phase control circuit 612 and the other portions of the circuit 600 when the triac 306 is not activated is provided between the hot line 24 and the neutral line 28 through the incandescent bulb 22. The small amount of current required to operate the LED 490 and the phase control circuit 612 is insufficient to cause the incandescent bulb 22 to emit any light. Thus, so long as the switch 320 is closed, a small amount of current will flow from the hot line 24 to the neutral line 28. When the switch 320 is open, no current flows between the hot line 24 and the neutral line 28, as required by Underwriters Laboratories.

The above-described embodiment of the present invention provides an aesthetically pleasing apparatus for incorporating a touch activated light switch into a conventional electrical switch box, either as new construction or as a direct replacement for an existing toggle switch. The present invention is installed in a conventional manner and utilizes a standard wall plate conventionally used for standard toggle switches. Thus, no special accessories or equipment are require to install the present invention in the place of a standard toggle switch. The present invention advantageously allows the wall plate to be aligned vertically irrespective of reasonable misalignment of the switch box in which it is installed. The present invention also includes the required feature of an air-gap switch which is activated by raising or lowering the touch panel assembly without affecting the aesthetic appearance of the switch. Furthermore, the present invention includes a positive indication that electrical power has been applied to the switch to activate it for touch-control use. The power indicator also provides a means for locating the touch panel of the touch control switch in a darkened room.

While preferred embodiments of this invention have been disclosed herein, those skilled in the art will appreciate the changes and modifications may be made therein without departing from the spirit and the scope of the invention as defined in the appended claims.

What is claimed is:

1. An improved touch-responsive control unit, mountable within a conventional electrical switch box in combination with a conventional wall plate having a rectangular conventional opening formed therein, and connectable between an a.c. source and an a.c. load, for controlling the amount of power applied to the a.c. load from the a.c. source, said control unit comprising:
   a first a.c. connector for connecting said control unit to said a.c. source and a second a.c. connector for connecting said control unit to said a.c. load;
   touch control circuitry electrically interposed between said first a.c. connector and said second a.c. connector for selectively electrically connecting said first a.c. connector to said second a.c. connector to selectively provide an electrically conductive path from said a.c. source to said a.c. load;
   an on-off switch, electrically interposed between said first a.c. connector and said touch control circuitry, said switch having an on-state for electrically connecting said a.c. source to said touch control circuitry, and having an off-state for electrically disconnecting said a.c. source from said touch control circuitry;
   a touch panel positionable proximate to an outer surface of said conventional wall plate when said wall plate covers said switch box, said touch panel having dimensions larger than said rectangular opening in said wall plate, said touch panel moveable in a plane parallel to said outer surface of said wall plate;
   first means for electrically connecting said touch panel to said touch control circuitry through said rectangular opening of said wall plate to conduct an electrical signal from said touch panel to said touch control circuitry in response to the application of a touch to said touch panel; and
   second means for mechanically connecting said touch panel to said on-off switch through said rectangular opening of said wall plate to communicate movement of said touch panel to said on-off switch to selectively switch said on-off switch between its on-off state and its off-state.

2. The improved touch responsive control unit as defined in claim 1 wherein said on-off switch is a slide switch and wherein said touch panel is movable to a first vertical position to switch said slide switch to its on-state and is movable to a second vertical position to switch said on-off switch to its off-state.

3. The improved touch responsive control unit as defined in claim 2 wherein said second means is a switch adaptor having a first end for receiving an actuator on said slide switch and having a second end which passes through said rectangular opening in said conventional wall plate, said touch panel mechanically connectable to said second end to thereby complete a mechanical connection between said switch and said touch panel.

4. The improved touch responsive control unit as defined in claim 1 wherein said first means is an electrically conductive pin having a first end which is electrically connected to said touch control circuitry and having a second end which passes through said rectangular opening in said conventional wall plate to thereby provide an electrically conductive path between said touch panel and said touch control circuitry.

5. The improved touch responsive control unit as defined in claim 4 wherein said touch panel includes a spring biased electrical contact positionable in electrical communication with said second end of said pin.

6. The improved touch responsive control unit as defined in claim 1 wherein said touch control circuitry further includes an indicator which emits light when said on-off switch is in its on-state and a.c. power is applied to said touch control circuitry from said a.c. source, and wherein said second means has an optically conducting portion to communicate said light emitted by said indicator to an opening in said touch panel so that said light is thereby observable.

7. An improved touch-responsive control unit mountable within a conventional wall-mounted switch box in combination with a conventional wall plate having a conventional rectangular opening formed in a flat surface of the wall plate, and connectable between an a.c. source and an a.c. load, for controlling the application of electrical power from said a.c. source to said a.c. load, comprising:

- a touch control circuit including an on-off switch having an on-state for electrically connecting said touch-control circuit to said a.c. source and having an off-state for electrically disconnecting said touch-control circuit from said a.c. source, said touch-control circuit mountable within said switch box and coverable by said conventional wall plate in a conventional manner;
- a touch panel positioned on the outside of said wall plate and moveable in a plane parallel to the surface of said wall, said touch panel having dimensions larger than the rectangular opening in said wall plate; and
- means extending through said conventional rectangular opening in said wall plate for mechanically connecting said touch panel to said on-off switch and electrically connecting said touch panel to said touch-control circuit to mechanically couple movement of said touch panel in said plane to said on-off switch to thereby switch said on-off switch between said on-state and said off-state and to electrically couple an electrical effect resulting from the touching of said touch panel to said touch-control circuit, said touch-control circuit responsive to said electrical effect to thereby control the application of electrical power to said a.c. load when said on-off switch is in said on-state.

* * * * *